US 9,578,061 B2

United States Patent
Clark et al.

(10) Patent No.: US 9,578,061 B2
(45) Date of Patent: Feb. 21, 2017

(54) SYSTEM AND METHOD FOR MODELING A NETWORKING DEVICE POLICY

(71) Applicant: FireMon, LLC, Overland Park, KS (US)

(72) Inventors: Patrick G. Clark, Overland Park, KS (US); Jody Brazil, Shawnee, KS (US)

(73) Assignee: FireMon, LLC, Overland Park, KS (US)

( * ) Notice: Subject to any disclaimer, the term of this patent is extended or adjusted under 35 U.S.C. 154(b) by 30 days.

(21) Appl. No.: 14/209,574

(22) Filed: Mar. 13, 2014

(65) Prior Publication Data

US 2014/0282854 A1 Sep. 18, 2014

Related U.S. Application Data

(60) Provisional application No. 61/780,566, filed on Mar. 13, 2013.

(51) Int. Cl.
*H04L 29/06* (2006.01)

(52) U.S. Cl.
CPC .......... *H04L 63/20* (2013.01); *H04L 63/0263* (2013.01)

(58) Field of Classification Search
CPC ...... H04L 63/00; H04L 63/02; H04L 63/0209; H04L 63/0218; H04L 63/0227; H04L 63/0263; H04L 63/14; H04L 63/1433; H04L 63/1441; H04L 63/1466; H04L 63/16; H04L 63/164; H04L 63/20
See application file for complete search history.

(56) References Cited

U.S. PATENT DOCUMENTS

| | | | |
|---|---|---|---|
| 7,610,621 B2 | 10/2009 | Turley et al. | |
| 7,818,793 B2 | 10/2010 | Gouda et al. | |
| 8,176,561 B1* | 5/2012 | Hurst et al. | 726/25 |
| 8,730,967 B1 | 5/2014 | Arad | |
| 2002/0051448 A1 | 5/2002 | Kalkunte et al. | |
| 2006/0195896 A1* | 8/2006 | Fulp et al. | 726/11 |
| 2006/0218280 A1* | 9/2006 | Gouda et al. | 709/226 |
| 2006/0294577 A1* | 12/2006 | Gouda et al. | 726/1 |
| 2007/0162968 A1 | 7/2007 | Ferreira et al. | |
| 2008/0301765 A1* | 12/2008 | Nicol et al. | 726/1 |
| 2010/0118871 A1 | 5/2010 | Liu et al. | |
| 2010/0205651 A1* | 8/2010 | Yanoo et al. | 726/1 |
| 2011/0213738 A1* | 9/2011 | Sen et al. | 706/12 |

(Continued)

OTHER PUBLICATIONS

Liu et al. Diverse Firewall Design, 2008, IEEE Transactions on Parallel and Distributed Systems, vol. 19, No. 9, pp. 1-15.*

(Continued)

*Primary Examiner* — Jung Kim
*Assistant Examiner* — Adrian Stoica
(74) *Attorney, Agent, or Firm* — Polsinelli PC (57) ABSTRACT

Implementations of the present disclosure involve a system and/or method for modeling a networking device policy or set of rules and/or transforming a networking device policy model into a set of comprehensible rules for presentation to a manager of the device. In one embodiment, the system and/or method includes converting one or more rules of the firewall device into a string of representative bits, creating a binary decision diagram from the converted rules of the firewall policy, transforming the binary decision diagram into a ternary tree diagram and analyzing the ternary tree diagram to condense the firewall policy into one or more rules comprehensible by a user of the firewall.

15 Claims, 7 Drawing Sheets

(56) References Cited

U.S. PATENT DOCUMENTS

2013/0085978 A1     4/2013   Goyal et al.
2014/0122791 A1*   5/2014   Fingerhut et al. ............ 711/108
2014/0201804 A1*   7/2014   Uthmani et al. .................. 726/1

OTHER PUBLICATIONS

Gouda et al. Structured firewall design, 2006, Elsevier B.V., Computer Networks 51 (2007), pp. 1106-1120.*

Yuan et al. Fireman: A Toolkit for FIREwall Modeling and ANalysis, 2006, IEEE Symposium on security and Privacy (S&P'06), pp. 1-15.*

Randal E. Bryant, Graph-Based Algorithms for Boolean Function Manipulation, 1986, IEEE Transactions on Computers, vol. C-35, No. 8, pp. 677-691.*

Gouda et al. Firewall Design: Consistyency, Completeness, and Compactness, 2004, IEEE Computer Society, ICDCS'04, pp. 1-8.*

Al-Shaer et al. Firewall Policy Advisor for Anomaly Discovery and Rule Editing, 2003, Springer Science+Business Media Dordrecht, pp. 17-30.*

Paul et al. Design and Implementation of Packet Filter Firewall using Binary Decision Diagram, 2011, IEEE, Proceedings of the 2011 IEEE Student's Technology Symposium, IIT Kharagpur, pp. 17-22.*

Hazelhurst et al. Binary Decision Diagram Representation of Firewall and Router Access Lists, 1998, Conference of the South African Institute of Computer Scientists and Information Technologists—SAICSIT, pp. 1-12.*

Clark et al., Firewall Policy Diagram: Structures for Firewall Behavior Comprehension, International Journal of Network Security, vol. 17, No. 2, Mar. 2015, ISSN 1816-3548 (Online).*

U.S. Appl. No. 14/209,771, filed Mar. 13, 2014, Clark et al.

Non-Final Office Action regarding U.S. Appl. No. 14/209,771, dated Apr. 24, 2015.

Response to Non-Final Office Action regarding U.S. Appl. No. 14/209,771, dated Jul. 24, 2015.

Hazelhurst, et. al. "Algorithms for improving the dependability of firewall and filter rule lists." Dependable Systems and Networks, 2000. DSN 2000. Proceedings International Conference on. IEEE, 2000.

Al-Shaer, et al. "Modeling and management of firewall policies." Network and Service Management, IEEE Transactions on 1.1 (2004): 2-10.

Al-Shaer, et. al. "Design and implementation of firewall policy advisor tools." DePaul University, CTI, Tech. Rep (2002).

Yuan, et al. "Fireman: A toolkit for firewall modeling and analysis." Security and Privacy, 2006 IEEE Symposium on. IEEE, 2006.

Notice of Allowance regarding U.S. Appl. No. 14/209,771, dated Oct. 19, 2015.

Corrected Notice of Allowability regarding U.S. Appl. No. 14/209,771, dated Nov. 23, 2015.

* cited by examiner

SYSTEM AND METHOD FOR MODELING A NETWORKING DEVICE POLICY

CROSS-REFERENCE TO RELATED APPLICATIONS

This application claims priority under 35 U.S.C. §119(e) to U.S. Provisional Application No. 61/780,566 entitled "FIREWALL POLICY DIAGRAM", filed on Mar. 13, 2013 which is incorporated by reference in its entirety herein.

FIELD OF THE DISCLOSURE

Aspects of the present invention relate to networks of computing devices and, more particularly, aspects of the present invention involve network devices, such as Open Systems Interconnection (OSI) Layer 3 network devices like firewalls, routers and switches and the security, routing, and translation functions associated with such devices. Use of the term "firewall" and "firewall device" throughout this document refers to such OSI Layer 3 network devices and functions associated with such devices.

BACKGROUND

Computer networking has been one of the most important advancements in modern computing. Allowing disparate applications operating on separate computer systems to trade information, conduct business, exchange financial transactions, and even the routine act of sending an email are some of the most common things we do with computers today. Even with the advancement of ever faster computing devices, the trend continues to connect devices at an astounding rate. In addition, there is also a thriving mobile device market, thus increasing the amount of traffic flowing between systems over any number of networks. The need to connect computing devices or networks such that the devices can communicate safely is essential to today's marketplace.

One important aspect of this interconnected network of computer systems and devices is security. Without security, the convenience and speed of networked transactions would present more risk than the majority of applications could handle. In order to mitigate that risk and provide a much more secure communication channel, a firewall device is typically deployed in most networks. In general, a firewall device is a software or hardware-based device that controls incoming and outgoing traffic to/from a network through an ordered set of rules, collectively referred to as a firewall policy. The primary purpose of a firewall is to act as the first line of defense against malicious and unauthorized traffic from affecting a network, keeping the information that an organization does not want out, while allowing approved access to flow into and out of the network.

While a static firewall policy may somewhat protect a network, a firewall policy with the ability to adapt to the ever-changing environment of a network, such as the Internet, allows the firewall to defend against the newest types of malicious attacks. However, as new attacks are discovered and new rules for addressing or handling those new attacks are added to a firewall's rule-base, management of a firewall policy quickly becomes overwhelming for network managers or engineers. Many firewall devices today include rule-sets with thousands of rules that continually grow as more and more threats to the network are identified. As such, the ability to accurately and confidently understand a firewall policy and know what changes have occurred is more difficult than ever and continues to increase in complexity with every passing day.

It is with these and other issues in mind that various aspects of the present disclosure were developed.

SUMMARY

One implementation of the present disclosure may take the form of a method for representing a networking device. The method comprises the operations of modeling at least one network device policy rule, utilizing at least one processor, as at least one bit string, creating a first hierarchical decision diagram from the at least one bit string and translating the first hierarchical decision diagram into a second hierarchical decision diagram. The method further includes the operations of obtaining one or more numerical intervals defined by the second hierarchical decision diagram, the one or more numerical intervals corresponding to paths through the second hierarchical decision diagram defining a portion of a solution space of a network device policy, converting the one or more numerical intervals into one or more network device policy rules and providing the one or more network device policy rules as a policy rule set.

Another implementation of the present disclosure may take the form of a system for modeling a network device policy rule set. The system comprises a processing device and a computer-readable medium with one or more executable instructions stored thereon, wherein the processing device executes the one or more instructions to perform certain operations. In particular, processing device performs the operations of translating at least one network device policy rule into at least one bit string, creating a first hierarchical decision diagram from the at least one bit string, the first hierarchical decision diagram being a binary decision diagram and converting the first hierarchical decision diagram into a second hierarchical decision diagram. In addition, the processing device also performs obtaining one or more numerical intervals defined by the second hierarchical decision diagram by traversing the second hierarchical decision diagram from a first root node of the second hierarchical decision diagram to at least one end node of the second hierarchical decision diagram, the one or more numerical intervals corresponding to paths through the second hierarchical decision diagram from the first root node to the at least one end node, and providing the one or more network device policy rules as a policy rule set, wherein the one or more network device policy rules are derived from the one or more numerical intervals.

DETAILED DESCRIPTION

Implementations of the present disclosure involve a system and/or method for modeling a firewall policy or set of rules and/or transforming a firewall policy model into a set of comprehensible rules for presentation to a manager of the firewall. As mentioned above, use of the term "firewall" and "firewall device" throughout this document refers to OSI Layer 3 network devices (such as routers, firewalls, and switches) and functions associated with such devices. In one embodiment, the system and/or method includes converting one or more rules of the firewall policy into a string of representative bits, creating a binary decision diagram from the converted rules of the firewall policy, transforming the binary decision diagram into a ternary tree diagram and analyzing the ternary tree diagram to condense the firewall policy into one or more rules comprehensible by a user of the firewall. This system and/or method may create a firewall policy diagram that models selected portions of the policy (such as the "accept" or "deny" space), provide the ability to perform mathematical operations on the firewall policy to determine changes in the policy over time or differences between sets of policies and provide comprehensible rule sets understandable by a user of the firewall.

Figure 1:
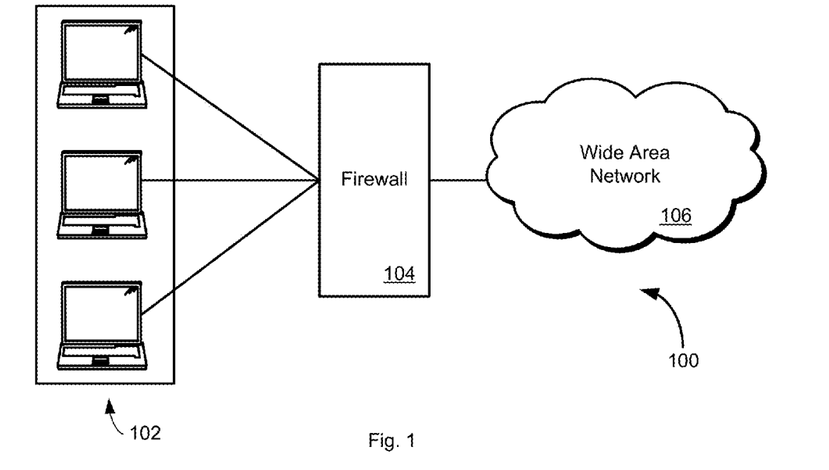
FIG. 1 illustrates an example network environment that may implement various systems and methods of the present disclosure.

FIG. 1 illustrates an example network environment 100 that may implement various systems and methods of the present disclosure. In particular, the network environment 100 includes one or more computing devices 102 (which collectively could form a local area network), a firewall 104 and a wide area network 106, such as the Internet. The computing device 102 may include any type of computing devices, including but not limited to a personal computing devices such as a personal computer, a laptop, a personal digital assistant, a cell phone, and the like and one or more routing devices, such as a server, a router, and the like. In general, the computing devices 102 may include any type of device that processes one or more communication packets.

In addition, the wide area network 106 may include one or more other computing or routing devices. As mentioned above, the Internet is one example of a wide area network 106, but any type of wide area network comprising one or more computing devices is contemplated. The firewall 104 is in communication between the wide area network 106 and the computing device 102 and operates to analyze and potentially filter communication packets transmitted between the networks. The operation of the firewall 102 is described in more detail below. One or ordinary skill in the art will recognize the various ways and communication protocols through which the computing devices 102 can connect to the firewall 104 and the firewall can connect to the wide area network 106 for communication between the networks. For simplicity, the various ways for connecting the components of the network environment 100 are omitted.

In general, the firewall 104 allows the two networks 102, 106 to communicate through the transfer of communication packets, while securing the private network behind the firewall. The typical placement of a firewall 104 is at the entry point into a network 102 so that all traffic passes through the firewall to enter the network. The traffic that passes through the firewall 102 is typically based on existing packet-based protocols, and a packet can be thought of as a tuple with a set number of fields. For example, a packet may include such fields as a source/destination IP address, port number, and/or a protocol field, among other fields. A firewall 102 typically inspects or analyzes each packet that travels through it and decide if it should allow the packet to pass through the firewall based on a sequence of rules pertaining to the values of the one or more fields in the packet. For example, a packet may include a source IP address may be 10.2.0.1 and destination IP address may be 192.168.1.1. A firewall rule may utilize those values to determine whether the packet is allowed into the network 102 or denied. For example, the firewall 104 may determine any packet with a source IP address of 10.2.0.1 is denied entry into the network 102. As such, the decision portion of a rule determines what happens if the value matches to a true evaluation by matching a field to a condition value and determining if the matching is true. The rule then typically employs an accept or deny action on the packet, with the possibility of additional actions, such as an instruction to log the action. However, for the purpose of this disclosure, only the case of accept or deny is discussed herein for simplicity.

As discussed above, a firewall policy is generally made up of an ordered list of these rules such that as a packet is processed by the firewall, the firewall attempts to match some aspect of the packet to the rule one rule at a time, from beginning of the rule list to the end. Matching the packet means that the firewall evaluates a packet based on the fields in the rule tuple to determine if the fields match the values identified in the rule. The rule does not necessarily need to contain a value for all possible fields and can sometimes contain an "any" variable in a field to indicate that the rule is a "do not care" condition for that variable. In general, these rules are processed in order until the firewall finds a match and takes the appropriate action identified by the decision portion of the rule.

Figure 2:
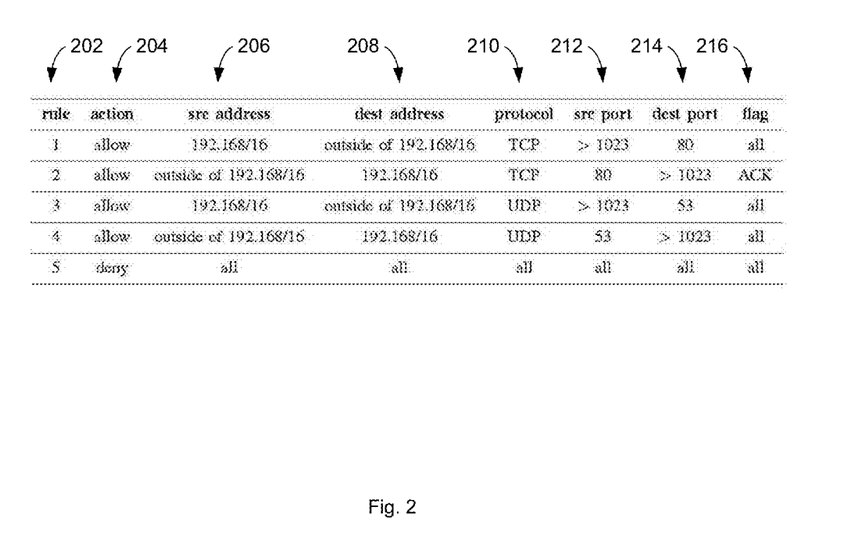
FIG. 2 is an example access control table for a firewall interface.

FIG. 2 is an example of an access control table for a firewall interface illustrating a rule set of a firewall 104 for a particular network 102. In particular, the rule set 200 of FIG. 2 includes five rules, numbered in the far right column 202 of the table. Column 204 indicates the action taken for each of the rules when the conditions of the rules are met and columns 206-216 provide the identifiers or portions of the packet that define the packet for each individual rule, otherwise known as the predicate of the rule. As shown in column 204, the rule set 200 either provides for allowing or denying the packet into the network when the predicate matches a received packet. Although only two actions are shown in the rule set 200 of FIG. 2, other actions may also be taken by the firewall, such as logging.

The predicate portion of the rules of the rule set 200 includes columns 206-216. In particular, column 206 establishes a source address or range of source addresses for each rule. For example, rule 1 of the rule set applies to packets with a source address of 192.168/16, while rule 2 applies to packets with a source address outside of 192.168/16. In a similar manner, column 208 includes a destination address for each particular rule. For example, rule 1 applies for a packet with a destination packet outside of 192.168/16. Column 210 designates a type of communication protocol for each rule in the rule set, column 212 designates a source port number for each rule, column 214 designates a destination port number for each rule and column 216 designates a flag state for each rule. Further, although the rule set 200 of FIG. 2 includes the particular columns discussed above, a rule set may consider any aspect of a communication packet as a predicate for the rules 202 in the rule set.

In general, a firewall 104 receives a communication packet from the wide area network 106 or the local area network 102 and compares portions of the communication packet to the rules 202 in the rule set 200 of the firewall. Further, these rules are generally processed in order until the firewall finds a match and takes the appropriate action identified by the decision portion 204 of the rule. Using the rule set 200 of FIG. 2 as an example; the firewall 104 compares the source address 206, destination address 208, protocol 210, source portal identifier 212, destination portal identifier 214 and flag state 216 of the communication packet to the corresponding column 206-216 entry for rule 1 of the rule set. If each of the entries in predicate columns 206-216 matches the corresponding communication packet portions, then the firewall 104 takes the action described in column 204 for that particular rule. In this case, the packet would be allowed by the firewall 104. However, if one or more of the communication packet portions do not match the corresponding entry in the predicate columns 206-216, then the firewall 104 moves to the next rule (in this case rule 2) and performs the same operations. The firewall 104 continues in this manner until a rule is found in the rule set 200 that matches the predicates of the packet. For example, as shown in the rule set 200, if the packet does not match the predicates for rules 1-4, rule 5 includes a deny action for all predicates.

Figure 3:
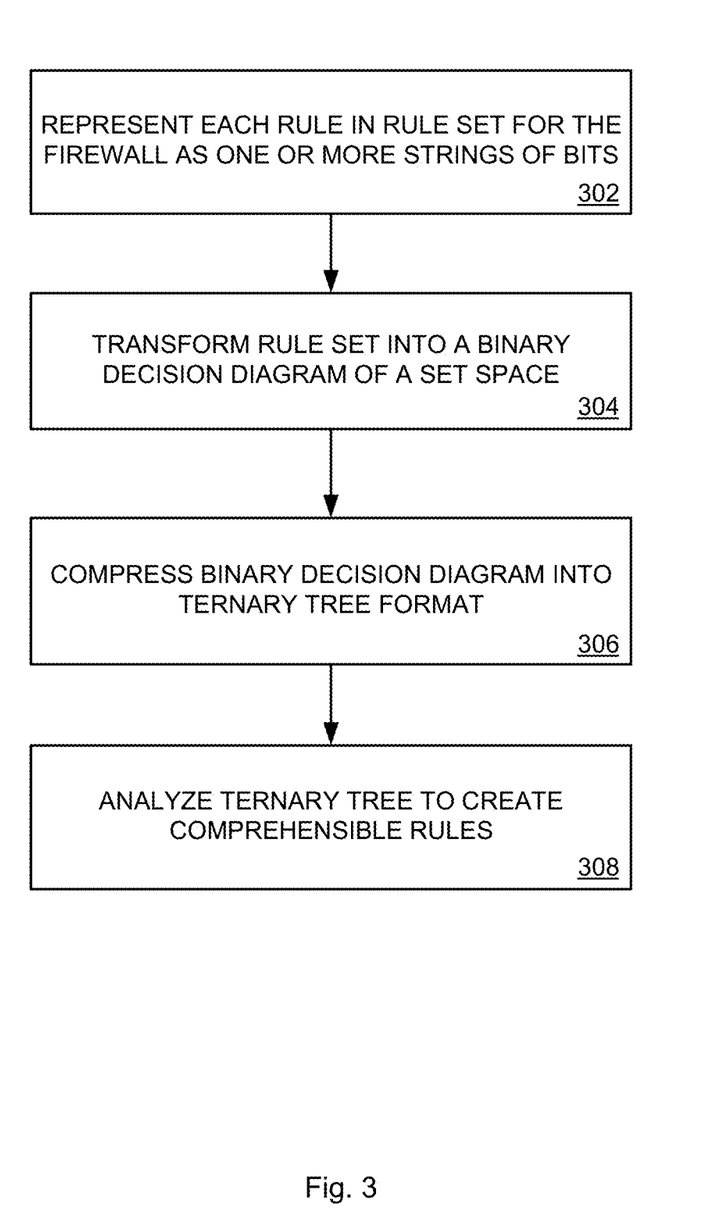
FIG. 3 is a flow chart illustrating a method for creating a firewall policy diagram of a firewall rule set and converting the policy diagram into a comprehensible form.

Although shown in FIG. 2 as include five rules, a rule set 200 for a firewall 104 may include several thousand rules. As such, rule sets can become unwieldy or confusing to a firewall or network administrator to navigate and understand. Understanding a firewall rule set or policy may be obtained through modeling and/or summarizing of the policy into more manageable and comprehensible rules that can be interpreted by the administrator. FIG. 3 is a flow chart illustrating one method for creating a firewall policy diagram of a firewall rule set and converting the policy diagram into a comprehensible form. In one embodiment of the method of FIG. 3, the operations are performed by a firewall device or computing device associated with a firewall and can be provided to an administrator of the firewall device or a related network to aid the administrator in managing the firewall policy.

Beginning in operation 302, the computing device translates or represents each rule in the rule set into one or more strings of bits. By representing each of the rules into one or more bit strings, a truth table of the rule set can be created. Using the rule set 200 of FIG. 2 as an example, the predicate values of the rules are represented by one or more bit strings. In particular, a bit string may represent a value for one or more of the predicates associated with a rule in the rule set 200. In one example, a string of 32 bits may represent a value in the source address column 206. Thus, using a source address of 192.168.20.2, which is a period sub-divided address representing 4 octets. In this example, the first octet is the base-10 value 192. To produce the first 8 bit binary number, it is converted from base-10 to base-2, so 192 to 1100000. In a similar manner the remaining 3 octets are converted to produce a binary number with 32 places equaling 11000001010100000001010000000010. In this manner, the values in the source address column 206 can be converted into bit strings for further processing of the rule set.

Similarly, other predicates of the rules of the rule set 200 may be converted into representative bit strings. For example, a 32 bit string may represent the destination address values in column 208, an 8 bit string may represent the protocol type of column 210, a 16 bit string may represent the source port number of column 212, a 16 bit string may represent the destination port number of column 214 and a 6 bit string may represent the flag indicator of column 216. However, the bit strings representing any value in the predicate fields of the rules may include any number of bits in the representative bit string. Further, in some embodiments, only particular predicate values of the rules are converted into bit strings. For example, in one embodiment, only the values of the source address, destination address, protocol, and destination port are converted into bit strings and considered in the method of FIG. 3. However, any field included in the packet may be used to analyze and model the rule set of the firewall policy.

Figure 4A:
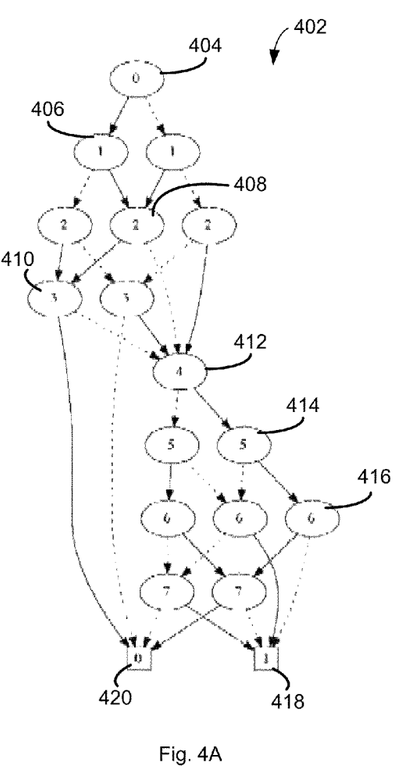
FIG. 4A is a binary decision diagram representing a particular rule of a firewall rule set.

Upon conversion of one or more predicates of the rule set into binary strings, a binary decision diagram (BDD) 402 of the rule set is created in operation 304 for a particular rule or set space. A BDD 402 is a diagram that visually represents a truth table of a function. An example BDD 402 is illustrated in FIG. 4A. In general, the diagram represents the result of the function depending on the values of the bits represented in the BDD 402. In particular, the BDD 402 of FIG. 4A illustrates a truth table for a function of an 8-bit string, represented in the table as bits 0-7. Each circle in the BDD 402 represents a bit of the 8-bit string and a result of the function can be determined by following a path down the BDD to a terminal, represented as the squares at the bottom of the BDD. Further, the lines connecting the bits of the BDD 402 indicate a high or low assertion of the bit. In particular, a solid line connecting two nodes indicates a high assertion of the particular bit and a dotted line indicates a low assertion of the particular bit. Thus, to determine the result of the function for a given eight bit string, a program begins at the top of the BDD 402 and follows the appropriate connecting lines through the BDD based on the values of the bits of the string (either the solid line for a high assertion or a dotted line for a low assertion) until the terminal value is determined. In this manner, the BDD 402 provides an illustrative diagram of a function of the 8-bit string. As should be appreciated, any type of BDD known or hereafter developed may be utilized by the disclosure described herein.

In one example, assume an 8-bit string of 11101100 that represents the predicate field of a rule of the rule set of the firewall policy. Typically, the bit string for such a rule would consist of much more bits. However, the 8-bit string mentioned above is used for example purposes herein. Beginning at node "0" 404 of the BDD 402 of FIG. 4A, the graph is traversed down the left arrow from the bit "0" circle 404 as the value of the most significant bit of the string in this case is high, reaching node 406 of the BDD. Node 406 represents the value at bit "1" of the string, or the second most significant bit. This bit also includes an asserted value. Thus, the right arrow from node 406 of the BDD 402 is traversed to node 408. Similarly, because the third most significant bit is also asserted, the left arrow is traversed from node 408 to node 410 (as a solid line represents an assertion at the bit associated with the particular node). A low or unasserted value at bit 3 traverses from node 410 to node 412. Continuing through the 8-bit string in this manner traverses from node 412 to node 414 and from node 414 to node 416. Because the value at bit position 6 is low or unasserted, bit position 7 (or the least significant bit of the string) is ignored and the resulting value of "1" or high 418 is the output of the represented function. In a similar manner, the BDD may be traversed to determine the function result of any combination of bits in the eight bit string. As such, the BDD 402 is a representation of an eight bit function corresponding to the example 8-bit string that represents the predicate field of a rule of the rule set of the firewall policy.

The BDD 402 of FIG. 4A is merely an example of a BDD. It should be appreciated that such a diagram may be implemented for one or more bit strings of any length. Thus, in operation 304 of the method of FIG. 3, the bit string representations of the predicates of the rules of the rule set 200 are converted in a BDD 402 that represents the rule set. For example, the 32 bit string representing the source address, the 32 bit string representing the destination address, the eight bits representing the protocol type and the 16 bits representing the destination port may be combined into a function and used to create a BDD 402 that represents each rule of the rule set 200 of the firewall policy. In this method each rule in the firewall policy is processing in the same manner as the firewall would have handled it. Therefore if the firewall processes its policy from top to bottom, each rule is converted into an individual BDD and then a boolean OR operation is applied to the overall firewall policy BDD. Once the entire policy is processed in this manner, the result is one BDD representing each distinct "action" identified by the rules. For example, if a rule is allowed to have three actions, "accept", "deny", and "log", then there would be three resulting BDD solution spaces representing the respective actions.

At this point we have a compressed data structure for use in mathematical set operations. So, the FPD in this form would be used for representing the solution space of the firewall policy. It is at this point the structure may be used in simulations (such as our behavior models). Furthermore, the FPD is truly a data structure to represent a hierarchical data set composed of potentially multiple distinct portions. In our example, the Source IP, Dest IP, etc. In addition, a ternary tree data structure may be utilized from the BDD to create one or more human comprehensible rules of the firewall policy.

Figure 4B:
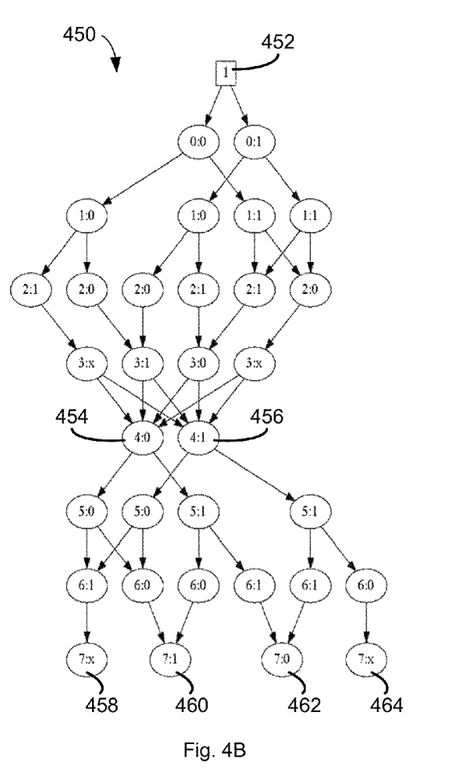
FIG. 4B is a ternary tree diagram corresponding to the binary decision diagram of FIG. 4A representing the particular rule of the firewall rule set.

Initially, the BDD is decompressed into a ternary tree format in operation 306. A ternary tree is a similar type of data tree to a BDD. However, in the ternary tree, each node may have three child nodes based on whether the value of the corresponding bit is high, low or "don't care". One example of a ternary tree structure is shown in FIG. 4B. More particularly, the ternary tree of FIG. 4B is a data structure for the data set illustrated in FIG. 4A. In other words, the data tree of FIG. 4B and the data tree of FIG. 4A illustrate the same rule set or function. The conversion of the BDD to the ternary tree structure is described in more detail below and in reference to the flowchart of FIG. 4.

The ternary tree data structure, as the name suggests, consists of three child nodes for every parent node. For example, a ternary tree has a low, high, and combination child node, such that the low represents a zero, the high represents a one, and the combination represents both one and zero. Thus, for a particular sequence of ordered variables solutions will have variables of three potential values: zero, one, or both, illustrated in the ternary tree of FIG. 5B as the potential values of 0, 1, and X, respectively. The definition of the 0 and 1 are the same as a binary tree data structure, and the variable represented in the node assumes that value. The new edge value of X represents that it is both zero and one for that particular variable at that particular node in the tree. The result is compression in the size of the tree by removing the need for a left and right sub tree and identifying the variables that can either be high or low.

In general, a ternary tree structure maintains the hierarchical nature of a data set, but in a more decompressed format in comparison to the BDD data structure outlined above. However, in a ternary tree structure, the representation of the values of a particular variable (identified by bit location) is stored with the node. Another difference is the order of the variables in the ternary tree structure, as they are representative of how a tree formed from algorithm 1 resulting in the least significant bit (LSB) variable at the root. These differences allow the tree to be pruned in reverse such that the process begins at the root and begin creating intervals as it is walked to a leaf. The process of pruning the ternary tree structure is explained in more detail below in relation to the flowchart of FIG. 7.

Figure 5:
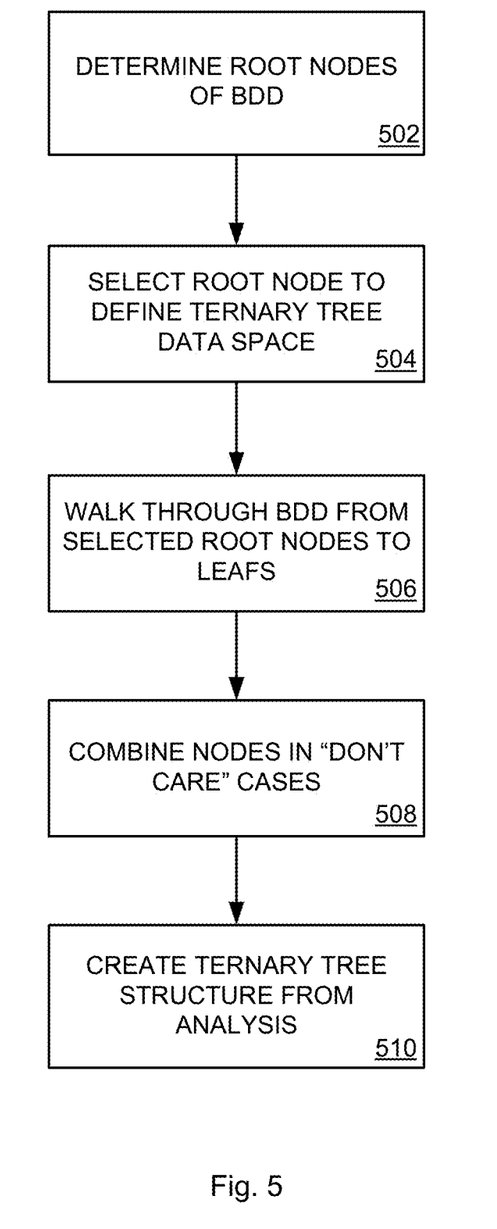
FIG. 5 is a flow chart illustrating a method for creating a ternary tree diagram of a firewall rule set.

FIG. 5 is a flow chart illustrating a method for creating a ternary tree diagram from a binary decision diagram data set. The operations of the method of FIG. 5 are discussed below in relation to the binary tree of FIG. 6A, resulting in the ternary tree structure of FIG. 6B. In general, the operations of FIG. 5 may be performed by a computing device, such as the computing device described below in relation to FIG. 8.

Beginning in operation 502, the computing device determines the root nodes of the binary tree describing the data set. For example, BDD 402 of FIG. 4A has two root nodes, node 418 and node 420. Root node 418 defines the instances where the data set results in an asserted value, or "1". Root node 420 defines the instances where the data set results in an unasserted value, or "0". In operation 504, the computing device than selects one of the determined root nodes that the resulting ternary tree structure will define. In particular, one advantage of the ternary tree structure is that a particular result of the data set may be selected for representation. For example, the ternary tree may represent the instances in the data set in which an asserted value results. In such a case, the root node 418 of the BDD 402 of FIG. 4A is selected by the computing device. In general, any resulting value or root node of the data set of the BDD may be selected for conversion into the ternary tree structure.

Figure 6A:
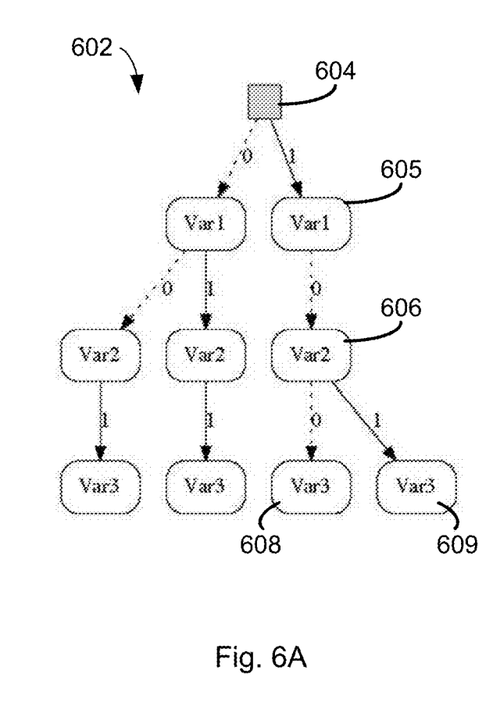
FIG. 6A and FIG. 6B illustrate an example conversion of a binary decision diagram of a data set into a ternary tree data set utilizing the method of FIG. 5.
Figure 6B:
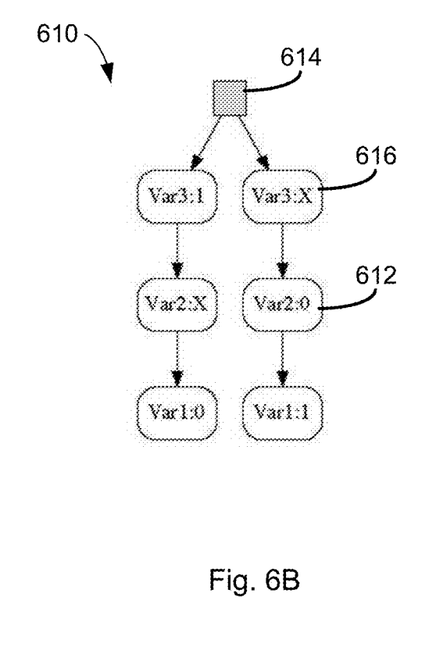

The relation between a binary tree and resulting ternary tree may best be illustrated in FIGS. 6A and 6B. In particular, the instances of a data set resulting in a particular value or state is illustrated by the binary tree 602 of FIG. 6A. In particular, the binary tree 602 represents a data set for a particular result for a three bit string, represented by variables one through 3 (illustrated as nodes "Var1", "Var2", and "Var3"). In this example binary tree 602, Var3 represents the least significant bit of the three bit string. As can be seen by walking through the example binary tree 602, values of the three bit string of "001", "011", "100", and "101" result in the root node 604 of the binary tree. Thus, if the binary tree 602 is an example of the truth table of a data set for achieving a particular result (such as an asserted or high output), the three bit string values of "001", "011", "100", and "101" provide that particular result. Although the binary tree 602 of FIG. 6A illustrates the binary tree for a particular result of a truth table, the binary tree may include other root nodes for other results, similar to the BDD illustrated in FIG. 4A.

FIG. 6B illustrates a ternary tree data structure 610 of the same data set illustrated in the binary tree 602 of FIG. 6A. In other words, both the binary tree 602 and the ternary tree 610 define the same truth table result data set. However, in the ternary tree structure 602, instances where either an asserted bit or an unasserted bit is included in the data set is represented in the ternary tree as an "X" case. In particular, the ternary tree includes nodes for each variable (or bits in a bit string) of the data set. These variables are the same variables as illustrated in the binary tree 602, so the identifiers "Var1", "Var2", and "Var3" are used. In addition, a representation of the values of a particular variable is stored with each node. For example, node 612 of the ternary tree 610 includes an identifier of the variable ("Var2") and a representation of a value of the variable of the node ("0" or unasserted). By combining the variable identifier and the value of the variable, the ternary tree structure 610 may be a compressed version of the binary tree representation.

To begin filling out the ternary tree structure 610 from the binary tree 602, the system walks through the binary tree starting at the root node to each leaf in operation 506 and fills in the variable identifier and variable value at each node of the ternary tree 610. It should be noted that the ternary tree 610 reorders the variables from the root node such that the least significant bit is at the root node 614 of the ternary tree. As explained in more detail below, the reordering of the variables allows for the tree to be pruned to condense the data into an understandable form.

As the system walks through the binary tree 602 to fill in the nodes of the ternary tree 610, the system may also account for the occurrence of a "don't care" or "either" case in operation 508. For example, binary tree 602 illustrates that either bit string "100" and "101" provide the particular result. In particular, nodes 605, 606 and 608 indicate the bit string "100" provides the particular result and nodes 605, 606 and 609 indicate the bit string "101" provides the particular result. Combining these two conditions indicates that the least significant bit is not needed or that either values in the least significant bit for these bit strings provides the particular result. In other words, this case may be written as "10X", where X is either a "1" or a "0". This case may be illustrated in the ternary tree 610 at node 616, which includes an indicator of variable 3 (or the least significant bit) and an "X" value for that variable. Thus, the ternary tree 610 may further reduce the size of the data structure by combining variables that can be either value into a single node. In this manner (as illustrated in operation 510), the system creates a ternary tree 610 from the binary tree 602 defining the data set.

The above description related to FIGS. 6A and 6B is a simple example of how a binary tree structure 602 relates to a ternary tree structure 610. In other words, the binary tree 602 and ternary tree 610 of FIGS. 6A and 6B illustrate how a solution space can be represented by the different data structures. As explained in greater detail below, the ternary tree structure of the solution space of the firewall policy provides an intermediary between the BDD and the pruned rules by allowing ranges in data to be represented and subsequently combined as the tree is pruned. This is information that cannot be easily ascertained from a canonical BDD representation.

One example algorithm for translating a BDD to a ternary tree structure is provide below:

```
Input: BDD Bdd Output: A fully formed Ternary Tree T
  procedure TRANSLATE(Bdd)
    T ← newTernaryTree
    for all R ∈ RootNodes(Bdd) do
      N ← createTernaryRoot(T)
      WALKEDGE(R.low, N)
      WALKEDGE(R.high, N)
    end for
  end procedure
```

```
procedure WALKEDGE(bN, tN)
  for bN.parent.var to bN.var − 1 do
    tN ← tN.middle ← newTernaryNode(X)
  end for
  if bN.var = Bdd.One then return
  end if
  if bN.low = Bdd.Zero then
    tN.left ← newTernaryNode(0)
    WALKEDGE(bN.low, tN.left)
  end if
  if bN.high ≠ Bdd.Zero then
    tN.right ← newTernaryNode(1)
    WALKEDGE(bN.high, tN.right)
  end if
end procedure
```

It should be appreciated, however, that any combination of a software program and/or hardware components performing one or more of the operations described above is contemplated as within the scope of the present disclosure. The particular example of software is provided as merely an example.

Utilizing the above operations, the BDD 402 of FIG. 4A may also be converted or translated into a ternary tree diagram. In general, a ternary tree data structure acts as an intermediary data structure that allows an algorithm to collapse the tree into a set of human comprehensible data structures. The pruning algorithm starts at the root node of the ternary tree and walks through the tree structure to the leaves (or end nodes), pruning and creating intervals. These intervals are then combined or translated to obtain a set of human comprehensible data structures that describe the rule set of a firewall policy. In one embodiment, the resulting data structure captures an interval and a count of bits in a conversion factor. The interval has a starting and ending number, with the conversion factor identifying how the interval sequence progresses. These intervals can be easily understood to provide a rule set describing a firewall policy.

As an example, consider the source IP address ternary tree that represents an odd number of IP addresses. In this example the interval would be the starting and ending values of the range with a conversion factor of 1. All individual values in an interval can be expressed using the procedure:

```
for i = Min; i<= Max; i += 2^{Conversion Factor}
do
    Value ← i
end for
```

As the ternary tree is walked to the heuristically defined leaves of the tree, the interval is transformed by bit shifting and sometimes cloning of the interval to represent a transformation from a hierarchical data set into a rule. As the algorithm progresses, a number of these intervals are captured and get merged where appropriate. The operation of pruning a ternary tree representing a data set is described in more detail below in relation to the flowchart of FIG. 7.

Figure 7:
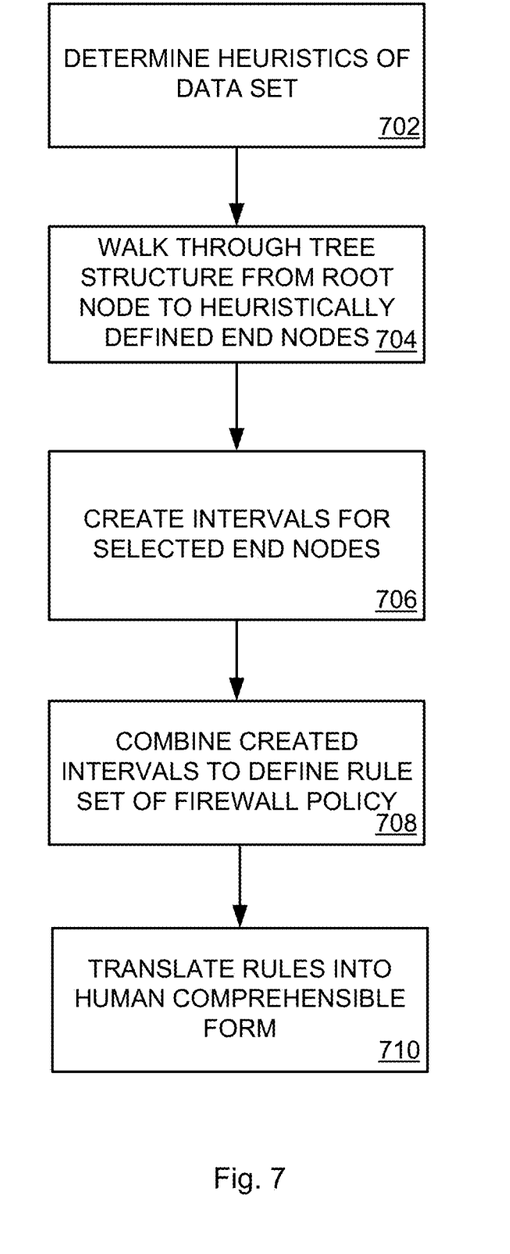
FIG. 7 is a flow chart illustrating a method for obtaining one or more rules from a ternary tree diagram of a firewall policy and illustrating the obtained one or more rules into a comprehensible form.

FIG. 7 is a flow chart illustrating a method for obtaining one or more rules from a ternary tree diagram of a firewall policy and illustrating the obtained one or more rules into a comprehensible form. Similar to the operations of FIG. 5, the operations of FIG. 7 may be performed by a computing device, such as the computing device described below in relation to FIG. 8. To perform the operations, the computing device may execute example algorithm provided below.

Beginning in operation 702, the system determines the heuristics of the data set illustrated in the ternary tree by analyzing the ternary tree diagram. The heuristics of the data set define where the hierarchical data sets begin. In the example described above where a 32 bit string represents the destination address value of a rule, and a 32 bit string represents the source port number of the rule, and a 14 bit string represents the service of the rule, heuristics may occur at the $32^{nd}$, $64^{th}$, and $88^{th}$ variables of the data set to divide the data set space into the separate portions comprising the rule. Notably, these algorithm described herein can be applied to other hierarchical data sets in other domains. They may be especially useful when dealing with large solution spaces and multiple hierarchies being combined to provide the composition of a desired "space".

Using the example ternary tree diagram 450 of FIG. 4B, a heuristic of the data structure is noted at variable 4, or nodes 454 and 456. For larger data sets that include additional hierarchies within the data set, more heuristic points within the data set may be identified by the system in operation 702. The ternary tree 450 of FIG. 4B represents a solution space as $2^8$, with a fictitious rule being made up of two fields of 4 binary variables which subsequently form an 8 binary variable solution space. As such, the heuristic point of this particular data set is at variable 4 of the data set.

Once the heuristics of the data set are determined, the system then walks through the ternary tree from the root node to the heuristically defined end nodes in operation 704. During the walk through the ternary tree diagram 450, the system may also note the variables encountered and the values associated with each variable to create one or more intervals contained within the data set of the ternary tree in operation 706. For example, the system may traverse the ternary tree 450 from the root node 452 to the end node 454 and collect the variable values associated with the nodes between the root node and the end node. These values may then be collected into one or more intervals defining the data set between the root node the end node. In addition, these operations may be performed for all of the heuristically defined end nodes and other end nodes within the ternary tree structure. An example further explaining operation 704 and operation 706 is provided below.

The result of the pruning through the operations above is that a list of de-correlated rules with intervals is provided. For example, the source IP interval range, destination IP interval range, and service interval range may be provided through the pruning operations. One effect of ordering the rule set variables in this manner is that the source IP to destination IP variable transition drives the number of distinct rules present in the final reconstituted rule set. Meaning, when the boundary in the variables is crossed while walking the ternary tree, a new rule is created and the remaining destination IP and service ranges are collected in that rule.

In operation 708, the system combines intervals obtained when possible to further simplify the obtained intervals. For example, different paths through the ternary tree structure 450 from the root node 450 to the end node 454 may provide different intervals. In operation 708, these intervals may be combined by the system to provide one or more intervals that define the data set for this portion of the ternary tree structure. These intervals may then be translated or otherwise provided to a manager of the firewall policy in operation 710. In particular, the provided intervals define the rule set of the firewall policy in a form that is understandable by the firewall manager. Thus, through the operations of the flowchart of FIG. 7, a large firewall policy may be translated into a ternary tree data structure and analyzed to provide human comprehensible rule sets defining the rule set for the firewall.

One example algorithm for performing the operations described in relation to FIG. 7 to is provide below:

```
Input: Ternary Tree Output: List of Rules that composed the SPACE
  procedure PRUNERULES(T )
    for all L ∈ Children(T.root) do
        Interval ← create(from =0, to = 0)
        Depth ← 0
           PARSENODE(L, Interval, 0)
    end for
  end procedure
  procedure PARSENODE(N,Interval,InV al)
    if N.value = X and Interval.factor empty and InV al = X then
        Interval.factor ← Depth
    end if
    if N.value = X then
        Interval.to ← to | 1 << depth
    end if
    if N.value =1 then
        Interval.from ← to | 1 << depth
        Interval.to ← to | 1 << depth
    end if
    if N is boundary then
        Rules ← Interval
        Interval ← create(from =0, to = 0)
        Depth ← 0
        PARSENODE(N.parent, Interval, 0)
    else if N not root then
        Depth = Depth +1
        if InVal = X and N.value = X then
            Interval ← clone(Interval)
            PARSENODE(N.left, Interval, N.value)
            PARSENODE(N.right, Interval, N.value)
            PARSENODE(N.middle, Interval, N.value)
        end if
        PARSENODE(N.parent, Interval, N.value)
    end if
end procedure
```

It should be appreciated, however, that any combination of a software program and/or hardware components performing one or more of the operations described above is contemplated as within the scope of the present disclosure. The particular example of software is provided as merely an example.

An example of the operations of the present disclosure is provided now in relation to the data structures of FIGS. 4A and 4B. As should be appreciated, a solution space for a firewall policy would be larger than the example provided herein. However, to simplify the concepts, a smaller solution space is utilized. For example, consider a solution space represented as $2^8$, with a fictitious rule being made up of two fields of 4 binary variables, A and B, which subsequently form an 8 binary variable solution space. In particular, as the stored reduced order BDD (ROBDD) is generated, A represents the decimal values 2 through 12 and B represents the decimal values 3 through 13. For example, A and B may be fields in a rule, similar to "source" and "destination" of a firewall rule. "A" represents the range 2-12, "B" represents the range 3-13. Together each of the four-bit field value ranges are combined to represent the BDD of FIG. 4A and the ternary tree of FIG. 4B. This may be the case when a firewall policy provides for transmission of an incoming communication packet when a four bit string representing a destination address value has a decimal value of 2 through 12 (represented as Rule A) and/or a four bit string representing a source address has a decimal value of 3 through 13 (represented as Rule B).

FIG. 4A visualizes the canonical BDD data structure 402 representing A and B with the LSB at the root 504, and referred to as variable zero. As the BDD 402 is walked from root node 504 to leaf nodes 418 (utilizing the operations described above in relation to FIG. 5), the tree is transformed into the ternary tree 450 seen in FIG. 4B. In particular, the variable transition values high and low are shifted to the variable values in the individual nodes illustrated in the ternary tree 450. The new root node 452 is created and the tree 450 is rooted at that node. In addition, the solution space removes the need for the edges leading to the zero value (illustrated in FIG. 4A as node 420) as the solution space does not care when the result is an unasserted output.

As indicated above, the ternary tree structure 450 acts as an intermediary data structure as human comprehensible intervals are extracted. Thus, utilizing the operations described in relation to the flowchart of FIG. 7, the ternary tree is walked from root node 452 to leaf nodes 454, 456 in an effort to create a set of rules with the described intervals that make up those rules. In particular, the system identifies the single boundary heuristic in this generalized example as variable 4 of our eight variables (using a zero index). This can be visually confirmed in the Ternary Tree with the existence of two nodes for variable 4. With this heuristic information, the system begins walking the ternary tree structure 450 from the root node 452 to heuristically defined leaf nodes 454, 456 in an effort to create intervals. The initial result is two groupings or rules being created.

In particular, in each rule there are two sets of intervals, those representing the variables 0 through 3 and those representing the variables 4 through 7. Further, the variable values relating to each rule can be obtained from the ternary tree structure 450. For example, walking the ternary tree 450 from the root node 452 through each path to end node 454 provides several four bit string values (with variable 0 being the least significant bit): X010, X011, X100, 1000, 1001, 0101, 0110, and 0111. Converted to the decimal values, these values provide the solution space of: 2 to 10 every $2^3$, 3 to 11 every $2^3$, 3 to 11 every $2^3$, 9, 8, 7, 6 and 5, respectively. Thus, these values define the solution space for Rule 1, segment 1 (variables 0-3).

Rule 1, segment 2 can be obtained from the ternary tree structure 450 by walking the ternary tree from the end node 454 through each path to each end node of variable 7 (nodes 458-462). The values obtained in this analysis (with variable 4 being the least significant bit) are: X100, 1010, 1000 and 0110. Converted to the decimal values, these values provide the solution space of: 4 to 12 every $2^3$, 10, 8 and 6, respectively. Thus, these values define the solution space for Rule 1, segment 2 (variables 4-7).

Continuing the above described operations, these intervals may then be combined to create a rule for the firewall policy. For example, the intervals for Rule 1, segment 1 may be merged into being represented by each decimal number 2 through 12. Subsequently the segment 2 interval may be merged into 4 to 12 every 2, so even numbers 4 through 12.

Based on a similar walking through the tree operation, the intervals for Rule 2 may also be obtained. For example, walking the ternary tree 450 from the root node 452 through each path to end node 456 provides the four bit string values (with variable 0 being the least significant bit) of: X010, X011, X100, 1000, 1001, 0101, 0110, and 0111. Converted to the decimal values, these values provide the solution space of: 2 to 10 every $2^3$, 3 to 11 every $2^3$, 3 to 11 every $2^3$, 9, 8, 7, 6 and 5, respectively. Thus, these values define the solution space for Rule B, segment 1 (variables 0-3). Walking the ternary tree 450 from the end node 456 through each path to each end node of variable 7 (nodes 458-462), the values obtained (with variable 4 being the least significant bit) are: X101, X011, 1001, and 0111. Converted to the decimal values, these values provide the solution space of: 5 to 13 every $2^3$, 3 to 11 every $2^3$, 9 and 7, respectively. Thus, these values define the solution space for Rule B, segment 2 (variables 4-7).

Combining the intervals for Rule 2, segment 1 provides an interval represented by each decimal number 2 through 12. Subsequently the segment 2 interval may be merged into 3 to 13 every 2, so odd numbers 3 through 13.

The final merge may then be reviewed between two rules such that when a segment of a rule matches another segment, as it does with segment 1 of Rule 1 and Rule 2, it may become one rule with the segment that is not matching (segment 2), being combined and reviewed for merges. Therefore, after Rule 1 merges with Rule 2, and since the segment 2 intervals represents overlapping odd and even ranges, the will become a contiguous decimal interval from 3 to 13. This reconstitutes our original rule that created the BDD 402: A=2-12, B=3-13; fit for human comprehension. This algorithm is in contrast to a more naive, brute force approach to processing all known "solutions" to the BDD. In the example presented here, there are 64 8-bit numbers that will need to be parsed back into the known intervals that created the BDD from the start. While that number may seem small, the example and solution space is small by design. The difference is between the number of solutions and the number of nodes in the ternary tree structure 450. In addition, the brute force method removes the hierarchical relationships between the nodes, further complicating reconstituting related intervals.

When a list of rules in a policy is decomposed into a firewall policy diagram, a reconstituted policy that covers the same equivalent ACCEPT or DENY space will result in a rule set with none of the resulting rules overlapping in any area. The primary reason for this behavior is that as a policy is decomposed one rule at a time, all inconsistent or overlapping rules are removed and you just have the space represented. The de-correlation property is useful in a number of scenarios. For example, a policy no longer has a need to be processed as an ordered set of rules, since the firewall policy diagram removes any overlapping rules. As a result, if the firewall policy diagram is built by the rules in the policy from last to first, the resulting system can match an incoming packet to all rules simultaneously. In addition, a policy may be substantially smaller and take much less time to process once it has been de-correlated. This behavior is the effect of the procedure that converts rules into the firewall policy diagram where it has also merged adjacent rules and removed any redundancies. In addition, the matching operation of a rule can be done in constant time. This is because matching a rule involves walking the data structure from root to result, which is a constant maximum of 88 elements.

Figure 8:
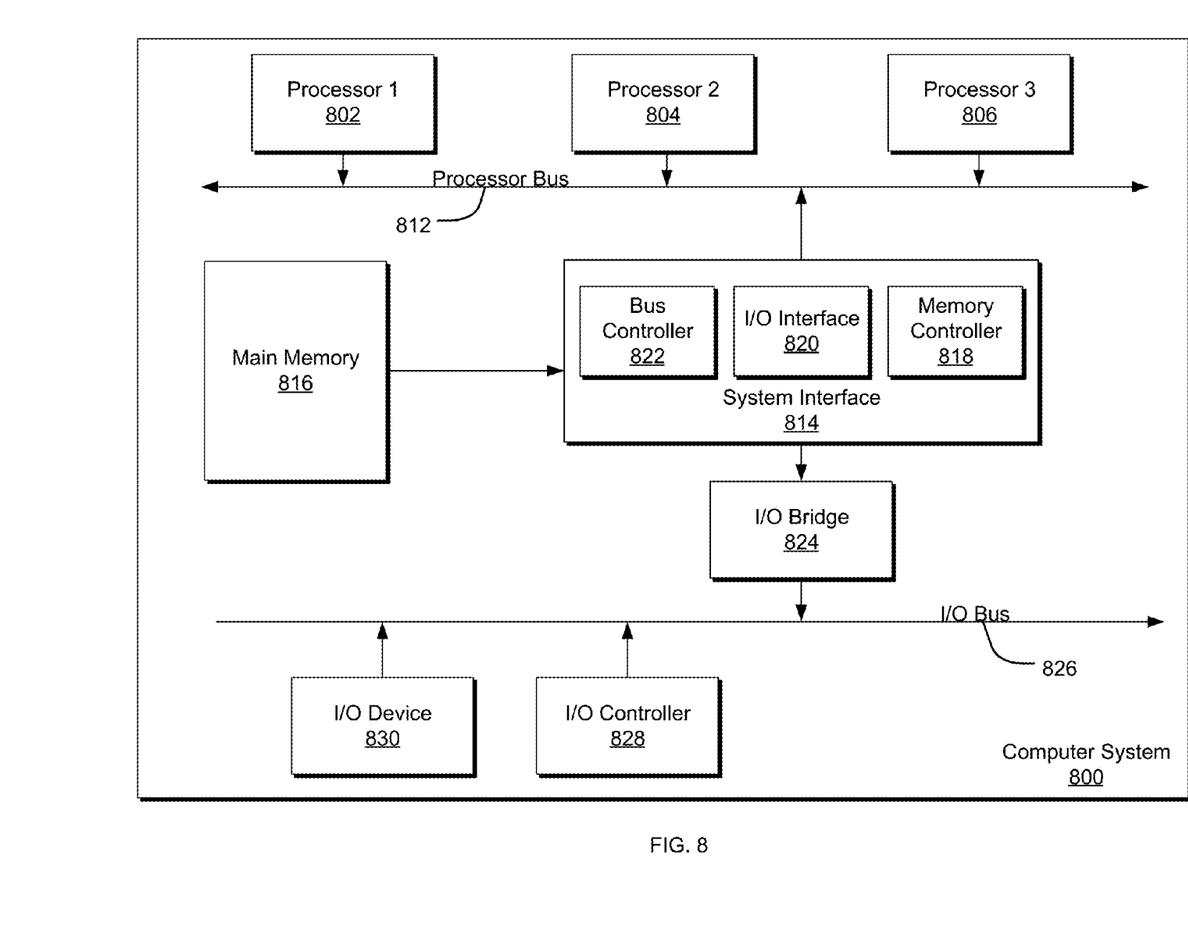
FIG. 8 is a block diagram illustrating an example of a computing system which may be used in implementing embodiments of the present disclosure.

FIG. 8 illustrates a computer system 800 capable of implementing the embodiments described herein. For example, the computer system 800 described in relation to FIG. 8 may be a computing system, such as a desktop or laptop computer with one or more software programs stored thereon for performing the operations described above. The computer system (system) includes one or more processors 802-806. Processors 802-806 may include one or more internal levels of cache (not shown) and a bus controller or bus interface unit to direct interaction with the processor bus 812. Processor bus 812, also known as the host bus or the front side bus, may be used to couple the processors 802-806 with the system interface 814. Processors 802-806 may also be purpose built for processing one or more computer-readable instructions.

System interface 814 may be connected to the processor bus 812 to interface other components of the system 800 with the processor bus 812. For example, system interface 814 may include a memory controller 818 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. One or more I/O controllers and/or I/O devices may be connected with the I/O bus 826, such as I/O controller 828 and I/O device 830, as illustrated.

I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system set forth in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 816. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for representing a networking device, the method comprising:
    modeling at least one network device policy rule of a network device policy, utilizing at least one processor, as at least one bit string comprising a plurality of bits representing the at least one network device policy rule;
    creating a first hierarchical decision diagram comprising a plurality of nodes and a plurality of connections between the plurality of nodes from the at least one bit string wherein each of the plurality of nodes of the first hierarchical decision diagram represents a bit of the plurality of bits of the at least one bit string;
    translating the first hierarchical decision diagram into a second hierarchical decision diagram;
    obtaining a plurality of numerical intervals defined by the second hierarchical decision diagram, the plurality of numerical intervals corresponding to paths through the second hierarchical decision diagram defining a portion of a solution space of a network device policy by traversing the second hierarchical decision diagram from a first root node of the second hierarchical decision diagram to a plurality of end nodes of the second hierarchical decision diagram, wherein the plurality of numerical intervals each comprise bit string values defining the paths through the second hierarchical decision diagram from the first root node to each of the plurality of end nodes;
    converting the plurality of numerical intervals into one or more network device policy rules based at least on a heuristically defined transition point between a first portion of the solution space of the network device policy and a second portion of the solution space of the network device policy, wherein the heuristically defined transition point occurs in the second hierarchical decision diagram between the first root node and the plurality of end nodes of the second hierarchical decision diagram as the second hierarchical decision diagram is traversed, wherein converting the plurality of numerical intervals into one or more network device policy rules comprises converting the plurality of bit string values defined by the second hierarchical decision diagram into a plurality of decimal intervals and combining at least two of the plurality of decimal intervals when the at least two decimal intervals are the same;
    providing the one or more network device policy rules as a policy rule set; and
    applying the policy rule set to the networking device as a de-correlated device policy.

2. The method of claim 1 wherein the first hierarchical decision diagram is a binary decision diagram representing the network device policy.

3. The method of claim 2 wherein the second hierarchical decision diagram is a ternary tree diagram representing the network device policy.

4. The method of claim 3 wherein the at least one network device policy rule comprises an action portion and a predicate portion and the at least one bit string represents the value of the predicate portion of the at least one network device policy rule.

5. The method of claim 4 wherein the predicate portion of the at least one network device policy rule comprises at least one of a source address, a destination address and a protocol indicator.

6. The method of claim 5 wherein modeling the predicate portion of the at least one network device policy rule into the at least one bit string comprises converting the source address value into a first bit string, converting the destination address into a second bit string and converting the protocol indicator into a third bit string.

7. The method of claim 4 wherein modeling the network device policy comprises creating the binary decision diagram from the at least one bit string representing the value of the predicate portion of the at least one network device policy rule.

8. A system for representing a networking device policy rule set, the system comprising:
a processing device; and
a computer-readable medium with one or more executable instructions stored thereon, wherein the processing device executes the one or more instructions to perform the operations of:
translating at least one network device policy rule of a network device policy of a networking device into at least one bit string, the at least one bit string comprising a plurality of bits representing the at least one network device policy rule;
creating a first hierarchical decision diagram comprising a plurality of nodes and a plurality of connections between the plurality of nodes from the at least one bit string, the first hierarchical decision diagram being a binary decision diagram with each of the plurality of nodes of the first hierarchical decision diagram representing a bit of the plurality of bits of the at least one bit string;
converting the first hierarchical decision diagram into a second hierarchical decision diagram;
obtaining a plurality of numerical intervals defined by the second hierarchical decision diagram by traversing the second hierarchical decision diagram from a first root node of the second hierarchical decision diagram to a plurality of end nodes of the second hierarchical decision diagram, the plurality of numerical intervals corresponding to paths through the second hierarchical decision diagram from the first root node to the at least one end node and comprising bit string values defining the paths through the second hierarchical decision diagram from the first root node to each of the plurality of end nodes;
converting the plurality of numerical intervals into one or more network device policy rules based at least on a heuristically defined transition point between a first portion of the solution space of the network device policy and a second portion of the solution space of the network device policy, wherein the heuristically defined transition point occurs in the second hierarchical decision diagram between the first root node and the plurality of end nodes of the second hierarchical decision diagram as the second hierarchical decision diagram is traversed, wherein converting the plurality of numerical intervals into one or more network device policy rules comprises converting the plurality of bit string values defined by the second hierarchical decision diagram into a plurality of decimal intervals and combining at least two of the plurality of decimal intervals when the at least two decimal intervals are the same;
providing the one or more network device policy rules as a policy rule set, wherein the one or more network policy rules are derived from the one or more numerical intervals; and
applying the policy rule set to the networking device as a de-correlated device policy.

9. The system of claim 8 wherein the second hierarchical decision diagram is a ternary tree diagram representing the network device policy.

10. The system of claim 9 wherein the at least one network device policy rule comprises an action portion and a predicate portion and the at least one bit string represents the value of the predicate portion of the at least one network device policy rule.

11. The system of claim 8 wherein the processing device executing the one or more instructions further performs the operation of:
combining the plurality of numerical intervals to simplify the network device policy rules that are derived from the plurality of numerical intervals.

12. The system of claim 10 wherein the predicate portion of the at least one network device policy rule comprises at least one of a source address, a destination address and a protocol indicator.

13. The system of claim 12 wherein the processing device executing the one or more instructions performs the operation of translating the at least one network device policy rule into at least one bit string by converting the source address value into a first bit string, converting the destination address into a second bit string and converting the protocol indicator into a third bit string.

14. The system of claim 13 wherein the binary decision diagram is a data structure representing at least the first bit string, the second bit string and third bit string.

15. The system of claim 14 wherein the second hierarchical decision diagram is a data structure representing a first solution space of the binary decision diagram, the first solution space being a portion of the entire solution space represented by the binary decision diagram.

* * * * *